United States Patent [19]

Emanuelsen

[11] Patent Number: 4,815,167

[45] Date of Patent: Mar. 28, 1989

[54] ARRANGEMENT IN MACHINES FOR GUTTING FISH

[75] Inventor: Karl J. Emanuelsen, Hafrsfjord, Norway

[73] Assignee: Trio Industrier A/S, Forus, Norway

[21] Appl. No.: 134,199

[22] Filed: Dec. 17, 1987

[51] Int. Cl.[4] ............................................. A22C 25/14
[52] U.S. Cl. ...................................... 17/52; 17/58
[58] Field of Search ...................................... 17/58, 52

[56] References Cited

U.S. PATENT DOCUMENTS

| 1,103,809 | 7/1914 | Mischler. | |
|---|---|---|---|
| 1,224,923 | 5/1917 | Haubner. | |
| 1,306,841 | 6/1919 | Waugh. | |
| 1,309,923 | 7/1919 | Waugh. | |
| 2,993,227 | 7/1961 | Couret | 17/58 |
| 3,925,846 | 12/1975 | Leander | 17/58 X |
| 4,563,793 | 1/1986 | Ryan | 17/58 |

FOREIGN PATENT DOCUMENTS

| 90421 | 9/1957 | Norway. |
| 1366837 | 9/1974 | United Kingdom. |

*Primary Examiner*—Willie G. Abercrombie
*Attorney, Agent, or Firm*—Foley & Lardner, Schwartz, Jeffery, Schwaab, Mack, Blumenthal & Evans

[57] ABSTRACT

In a machine for gutting fish, particularly trout and salmon, wherein the fish is guided through the machine in swimming position, and wherein the machine comprises tools for cutting the fish's belly, removal of the intestines, cutting the abdominal membrane covering the blood rim, and removal of the blood rim, one has aimed to provide a tool for cutting said abdominal membrane such that the blood rim is not torn up, and such that the rear part of the abdominal cavity of the fish is not damaged. This is achieved in that the cutting tool for the abdominal membrane consists of a rotary knife disc (4) having a V-shaped circumference portion (4', 4"). When such a knife disc (4) approaches the rear edge of the abdominal cavity of the fish, the fish will be raised by the V-shaped circumference portion of the knife disc, so that one avoids that the knife discs causes damages in the rear part of the abdominal cavity of the fish.

8 Claims, 3 Drawing Sheets

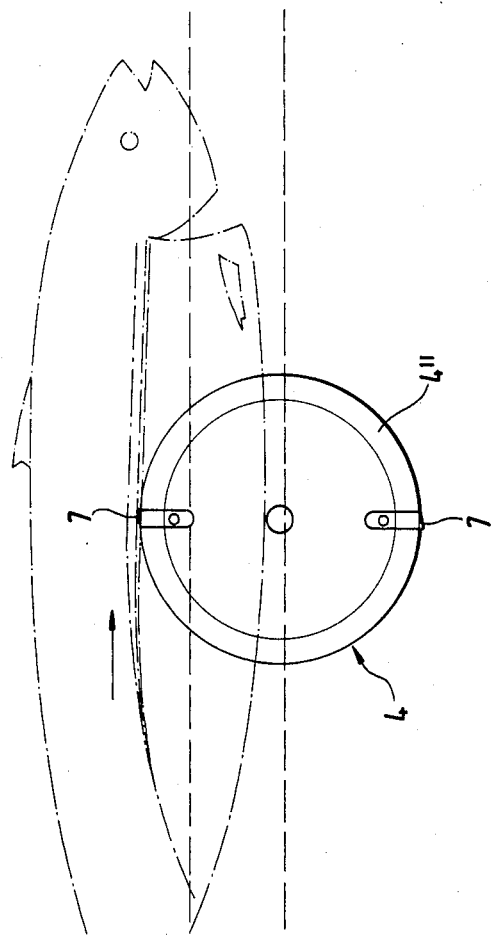

ARRANGEMENT IN MACHINES FOR GUTTING FISH

BACKGROUND OF THE INVENTION

1. Field of the Invention

This invention relates to an arrangement in machines for gutting fish, particularly trout and salmon.

2. Related Art

Known machines for gutting fish are to a high degree constructed in view of treating fish to be further processed. Thus, relatively moderate requirements may be made of the accuracy of the treatment effected by the machine.

For gutting trout and salmon, machines are previously known wherein the fish is guided through the machine in swimming position by means of endless advance means such as belts or chains having vertical rotation axis and which grip the fish laterally and guide it through the machine. The fish is fed into the gutting machine so that a spear-like means arranged centrally between the belts and pointing against the advance direction of the fish, is threaded into the belly through an opening being exposed by cutting the throat of the fish. The spear is thereafter threaded out through the fish's anal orifice. The continuation of the spear forms the limitation for that part of the fish belly being cut open by a rotating circular knife underneath.

As the fish is being guided forward by said belts, belly cutting, removal of intestines and cleaning are effected by means of a number of tools arranged one after the other in the longitudinal direction of the machine (the feeding direction of the fish) and each rotating around a horizontal axis transversely of machine's longitudinal direction.

Some disadvantages are associated with these known machines.

Removal of the blood rim constitutes a particular problem. The blood rim is protected by a strong abdominal membrane. In the known gutting machines abdominal this membrane is attempted to be removed by letting the fish pass over a rotating circular disc the circumference portion of which is formed with a number of recesses. Such a rotating circular disc is capable of removing said abdominal membrane, but at the same time it tears up the blood rim, so that the blood rim may not thereafter removed as a continuous piece. Additionally, the recesses of the circular disc will cause damage to the fish's belly.

The object of the present invention is to provide a cutting device effecting cutting of the belly membrane covering the blood rim without tearing up the blood rim, so that this afterwards may be removed substantially in one continuous piece, and without the cutting device causing damage to the rear part of the abdominal cavity.

The object is achieved by means of a cutting device formed in accordance with the feature appearing from the following claims.

SUMMARY OF THE INVENTION

According to the present invention a cutting device is formed as a rotating knife disc the sides of which adjacent the circumference are bevelled so that the rotating knife disc exhibits substantially octagonal cross sectional shape. The rotating knife disc when approaching the rear edge of the fish's abdominal cavity will lift the fish by its V-shaped circumference portion, so that the rotating knife disc does not cause damage to the rear part of the abdominal cavity of the fish. The rotating knife disc can have one or more knives mounted at its periphery.

BRIEF DESCRIPTION OF THE DRAWINGS

The invention is further explained in the following with reference to an embodiment shown in the drawings, wherein:

FIG. 4 and 5 correspond to FIG. 2 and 3, and show, on a smaller scale, a fish located over the knife disc.

DETAILED DESCRIPTION OF THE PREFERRED EMBODIMENT

Figure 1:
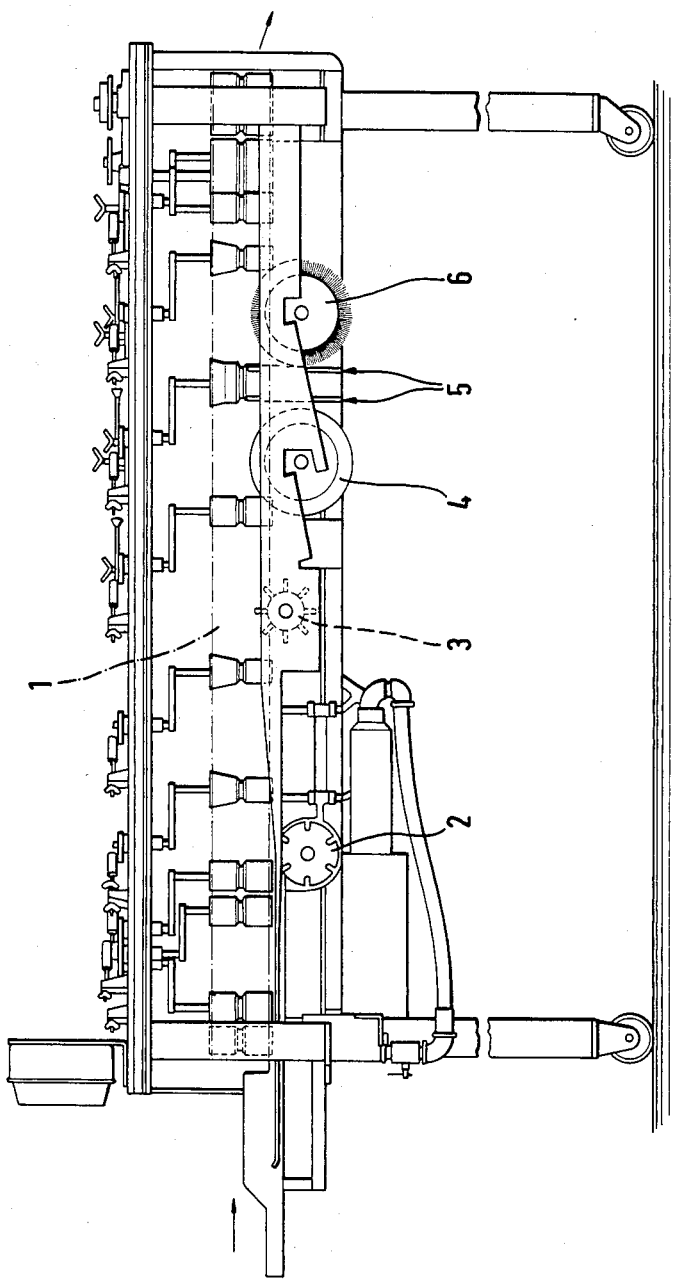
FIG. 1 shows a side view of a gutting machine for fish, particularly trout and salmon.

The gutting machine shown in the drawings is particularly intended for gutting trout and salmon, being of the kind wherein the fish is guided into the machine in swimming position, head first in the feeding direction, and is guided through the machine in this position by means of a pair of horizontally extending endless belts 1 having vertical rotation axis for the drive rollers. Such feeding devices are well known in fish processing machines and, accordingly, are not further described. They serve, as known, to draw the fish past working tools such as rotating circular blades, brush discs, etc., for belly cutting, removal of intestines, cleaning and so on.

During its advance through the shown embodiment of the gutting machine, the fish will at first come into contact with an underlying rotary circular blade 2 serving to cut open the fish's belly. Thereafter, the fish comes into contact with a so-called finger wheel 3, i.e. a rotary wheel having radially projecting fingers. This serves to remove the intestines. After the finger wheel 3 follows a rotary knife disc 4 for cutting the abdominal membrane covering the blood rim, without damaging the blood rim itself. The blood rim is to be removed as a continuous piece by subsequent scraping or cutting means 5. The reference numeral 6 in FIG. 1 denotes a rotary brush wheel for cleaning the fish's belly.

The rotary knife disc 4 is, according to the embodiment, provided with two knives 7 fastened with screws at the periphery. Although two knives 7 are shown in the embodiment, an arbitrary number of knives may be used within the scope of the invention, possibly also a continuous knife edge such as a circular blade.

Figures 2, 3:
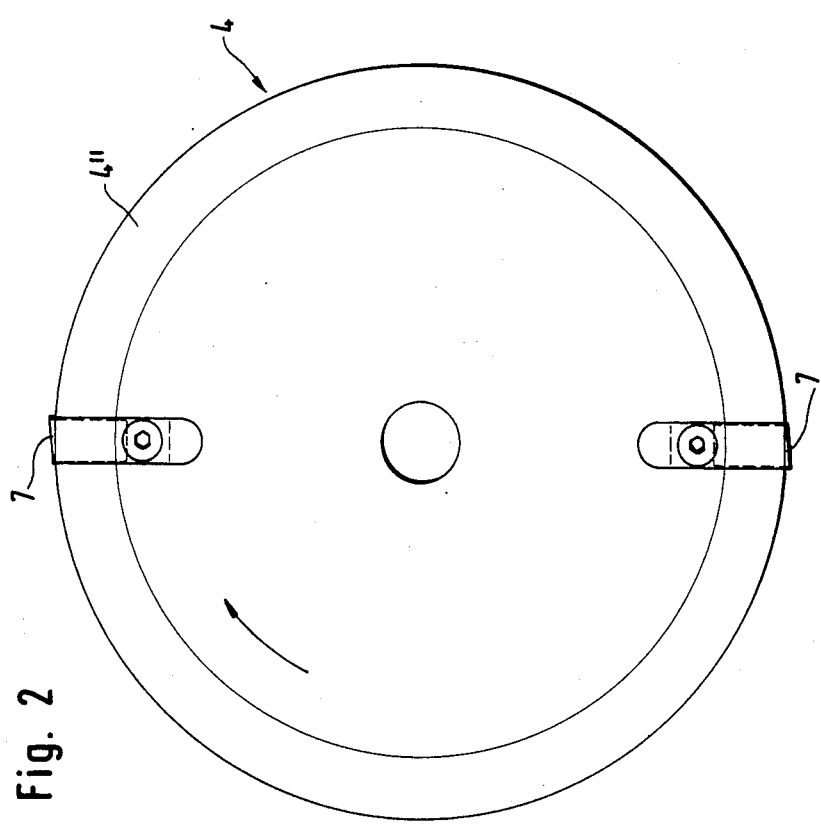
FIG. 2 is a side view of a rotary knife disc according to the invention, shown separately and on a larger scale.
FIG. 3 shows an end view of the rotary knife disc in FIG. 2, i.e. as seen in the feeding direction of the fish.

The flanks of the rotary knife disc 4 are bevelled at the circumference such that the rotary knife disc 4 exhibits a preferably V-shaped design, as shown in FIG. 3, wherein the V-shaped peripheral portion is represented by the surface 4' and 4".

When the machine is operating and a fish comes into contact with the rotating knife disc 4, the knife disc will cut through the abdominal membane covering the blood rim without tearing up the blood rim itself, so that this subsequently may be removed substantially in one continuous piece by the subsequent scraping or cutting means 5. When the rotating knife disc approaches the rear edge of the abdominal cavity, the fish, because of the shape of the knife disc 4, will be raised by means of the V-shaped circumference portion 4', 4" of the knife disc, thereby avoiding that the knife disc causes damages in the rear part of the abdominal cavity of the fish.

I claim:

1. Apparatus for gutting fish, particularly trout and salmon, said fish having intestines, abdomen, abdominal membrane, abdominal cavity and blood rim, wherein the fish is guided through the apparatus in a swimming position, comprising:

means for slitting the abdomen of the fish;
means for removing the intestines of the fish;
means for cutting the abdominal membrane covering the blood rim without tearing the blood rim and without damaging the rear part of the abdominal cavity of the fish;
said cutting means comprising a rotary knife disk having a cylindrical central section and a pair of sides formed by identical truncated conical sections; and
a plurality of cutter blades protruding from said central cylindrical circumference section.

2. An apparatus according to claim 1 wherein said rotary knife disk has a substantially octagonal cross-sectional shape.

3. An apparatus according to claim 1 wherein said plurality of cutter blades are substantially trapezoidal in shape, diametrically opposed in location, and protrude fewer than 2mm from said cylindrical central section.

4. An apparatus for gutting a forward moving fish, said fish having intestines, abdomen, abdominal membrane, abdominal cavity and blood rim, without tearing the blood rim or damaging the rear part of the abdominal cavity of the fish, comprising:

means for slitting the abdomen of the fish;
means for removing the intestines of the fish;
means for cutting the abdominal membrane covering the blood rim without tearing the blood rim and without damaging the rear part of the abdominal cavity of the fish;
said cutting means comprising two identical truncated conical halves, the larger bases of which face each other, having a cylindrical central section disposed therebetween, said truncated conical halves substantially conforming to the shape of the abdominal cavity of the fish; and
a projection disposed on said cylindrical central section extending from said cylindrical central section for cutting the abdominal membrane of the fish.

5. An apparatus according to claim 4 wherein said projection comprises a plurality of diametrically opposed knife blades extending less than 2mm from said cylindrical central section.

6. A device for cutting the abdominal membrane of an eviscerated fish, said fish having a blood rim and abdominal cavity, without tearing the blood rim or damaging the rear part of the abdominal cavity of the fish, comprising:

two identical truncated conical halves, the larger bases of which face each other;
said truncated conical halves substantially conforming to the shape of the inner cavity of the fish;
a cylindrical central section disposed therebetween; and
a means for cutting the abdominal membrane of the fish disposed on said cylindrical central section and extending from said cylindrical central section.

7. A device according to claim 6 wherein said cutting means comprise a plurality of diametrically opposed, substantially trapezoidal blades extending fewer than 2mm from said cylindrical central section.

8. A method for gutting a forward moving fish, said fish having intestines, abdomen, abdominal cavity, abdominal membrane, anus and blood rim, without tearing the blood rim or damaging the rear part of the abdominal cavity of the fish, which method comprises:

transporting the fish in the swimming position;
cutting the abdomen of the fish;
removing the fish intestines;
cutting the abdominal membrane without tearing the blood rim;
lifting the caudal section of the fish to avoid damaging the rear part of the abdominal cavity or anus of the fish; and
removing the blood rim substantially in one continuous piece.

* * * * *